United States Patent [19]

Launie et al.

[11] Patent Number: 4,593,983

[45] Date of Patent: Jun. 10, 1986

[54] PHOTOGRAPHIC APPARATUS HAVING A FILM CASSETTE COUNTER

[75] Inventors: Kenneth J. Launie, Cambridge; George D. Whiteside, Lexington, both of Mass.

[73] Assignee: Polaroid Corporation, Cambridge, Mass.

[21] Appl. No.: 682,989

[22] Filed: Dec. 18, 1984

[51] Int. Cl.⁴ .................. G03B 17/18; G03B 17/36
[52] U.S. Cl. .................. 354/217; 354/289.1; 235/91 C
[58] Field of Search ............... 354/83–86, 354/202, 212, 215, 217, 218, 289.1, 354; 116/213; 235/91 C, 98 R

[56] References Cited

U.S. PATENT DOCUMENTS

| | | | |
|---|---|---|---|
| 548,782 | 10/1895 | Lewis | 235/91 C |
| 553,479 | 1/1896 | Willis | 235/91 C |
| 619,860 | 1/1899 | Bullard et al. | 235/91 C |
| 2,282,044 | 5/1942 | Fairbanks | 95/31 |
| 2,858,752 | 11/1958 | Winkler et al. | 95/31 |
| 3,136,291 | 6/1964 | Irisawa et al. | 116/114 |
| 3,363,528 | 1/1968 | Winkler et al. | 95/31 |
| 3,653,313 | 4/1972 | Leduc | 95/42 |
| 3,965,480 | 6/1976 | Eloranta | 354/83 |
| 4,249,811 | 2/1981 | Douglas | 354/86 |
| 4,466,584 | 8/1984 | Chevalier et al. | 242/199 |
| 4,508,441 | 4/1985 | Launie et al. | 354/217 |

*Primary Examiner*—William B. Perkey
*Attorney, Agent, or Firm*—Alfred E. Corrigan

[57] ABSTRACT

Photographic apparatus for locating a film cassette in position for the sequential exposure of a plurality of film units contained within the film cassette. The apparatus includes a film counter for indicating the number of unexposed film units remaining within a film cassette, and a film cassette counter which is indexed each time a film cassette is inserted into the apparatus or, alternatively, removed therefrom. When such a camera is returned to a repair facility, the reading of the film cassette counter may be used in connection with reliability studies, warranties, market research on film use, e.g., how much film is exposed in a certain camera model, etc.

8 Claims, 5 Drawing Figures

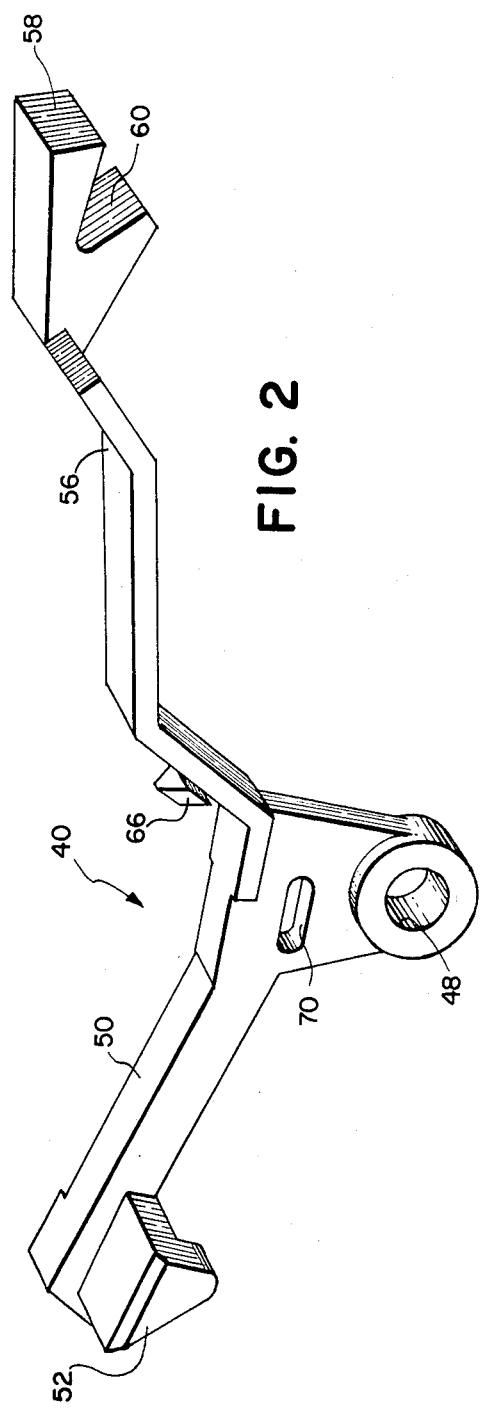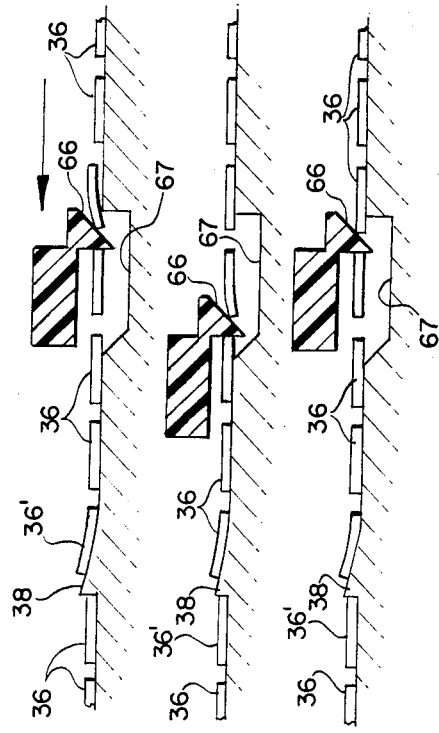

PHOTOGRAPHIC APPARATUS HAVING A FILM CASSETTE COUNTER

BACKGROUND OF THE INVENTION

1. Field of the Invention

The invention relates to photographic apparatus having a counter which indicates the number of film containers or cassettes which have been inserted into or removed therefrom.

2. Description of the Prior Art

For years photographic apparatus, e.g. cameras or camera backs, have been provided with counters which provide an indication of the number of unexposed film units or frames which remain within a film cassette located within the camera. The counter may be of the type which is reset only when a new film pack or cassette is inserted into the camera, as decribed in U.S. Pat. No. 3,363,528, or the counter may be automatically reset when the film cassette is removed from the camera, as described in U.S. Pat. No. 2,858,752. Still other counters provide a signal in a view finder window after a predetermined number of film units have been exposed, e.g., see U.S. Pat. No. 3,136,291. Further, counters may be combined with other parts of a camera such as a film cassette ejector, as described in U.S. Pat. No. 2,282,044. Sometimes the film counter is indexed in response to the movement of a mirror between viewing and taking positions, as shown in U.S. Pat. No. 3,653,313 or the counter's indexing member may be an integral part of a film advancing apparatus, as shown in U.S. Pat. Nos. 4,249,811 and 3,965,480. However, as mentioned previously, the above-described counters merely indicate the number of film units or frames which have been exposed or remain unexposed. Further, this information is lost when the counter is reset. Thus, it can be seen that such information is available only for certain periods of time, and is of limited value.

SUMMARY OF THE INVENTION

The present invention relates to photographic apparatus for receiving and locating a film cassette or other such film container in position for the sequential exposure of a plurality of film units contained therein, and more particularly to such an apparatus having a counter which is indexable in response to a film cassette being inserted into the apparatus. The photographic apparatus preferably takes the form of a camera having a film chamber into which a film container housing a plurality of film units is adapted to be inserted. The film chamber is defined in part by a side wall having means on an exterior surface thereof for rotatably supporting a disk-shaped counter having a plurality of radially extending fingers (indexable members) around its periphery. Also mounted on this side wall is a unitary member which includes a first end having a portion which extends inwardly into the film chamber to a position where it can sense a film cassette being inserted into the film chamber. More specifically, the unitary member is resiliently biased by a spring into a position in which the aforementioned portion thereof is located in the path of travel of a film cassette as it is being inserted into the film chamber. As the film cassette is moved into the film chamber, its trailing end engages the portion of the unitary member and cams it upwardly out of further interference with continued insertion movement of the film cassette. Such upward movement of the porion of the unitary member is transferred to the disk-shaped counter by a protuberance on the unitary member which serves to interconnect it with the counter such that the movement of the unitary member, in response to the upward camming of the portion, is used to index the counter. A detent on the side wall serves to maintain the counter in its newly indexed position. The camera also includes a film counter which is indexed during each exposure cycle by an element of the camera's film advance mechanism. A second end of the unitary member functions as a pawl to maintain the film counter in its newly indexed position. When the film cassette is removed from the film chamber, the aforementioned spring rotates the unitary member into a position wherein the portion of the first end is again located in the path of movement of a film cassette being inserted into the film chamber, while the second end (pawl) is simultaneously moved out of engagement with the film counter thereby allowing it to return to its starting position.

Preferably, the above-identified film cassette counter is not readable by the photographer vis-a-vis the film counter. Once a camera containing such a film cassette counter is returned to a camera repair facility, access is had to the film cassette counter and its reading recorded for further use in connection with reliability studies, market research on film usage, warranties, etc.

An object of the invention is to provide photographic apparatus with means for recording the total number of film cassettes which have been used therein.

Another object of the invention is to provide photographic apparatus having a film counter and a film cassette counter with unitary means for indexing the film cassette counter and for maintaining the film counter in a newly indexed position.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is an enlarged perspective view of a unitary member used in conjunction with the camera's film cassette counter; and FIGS. 3–5 are schematic representations of successive steps in the indexing of the film cassette counter.

DETAILED DESCRIPTION OF THE INVENTION

Figure 1:
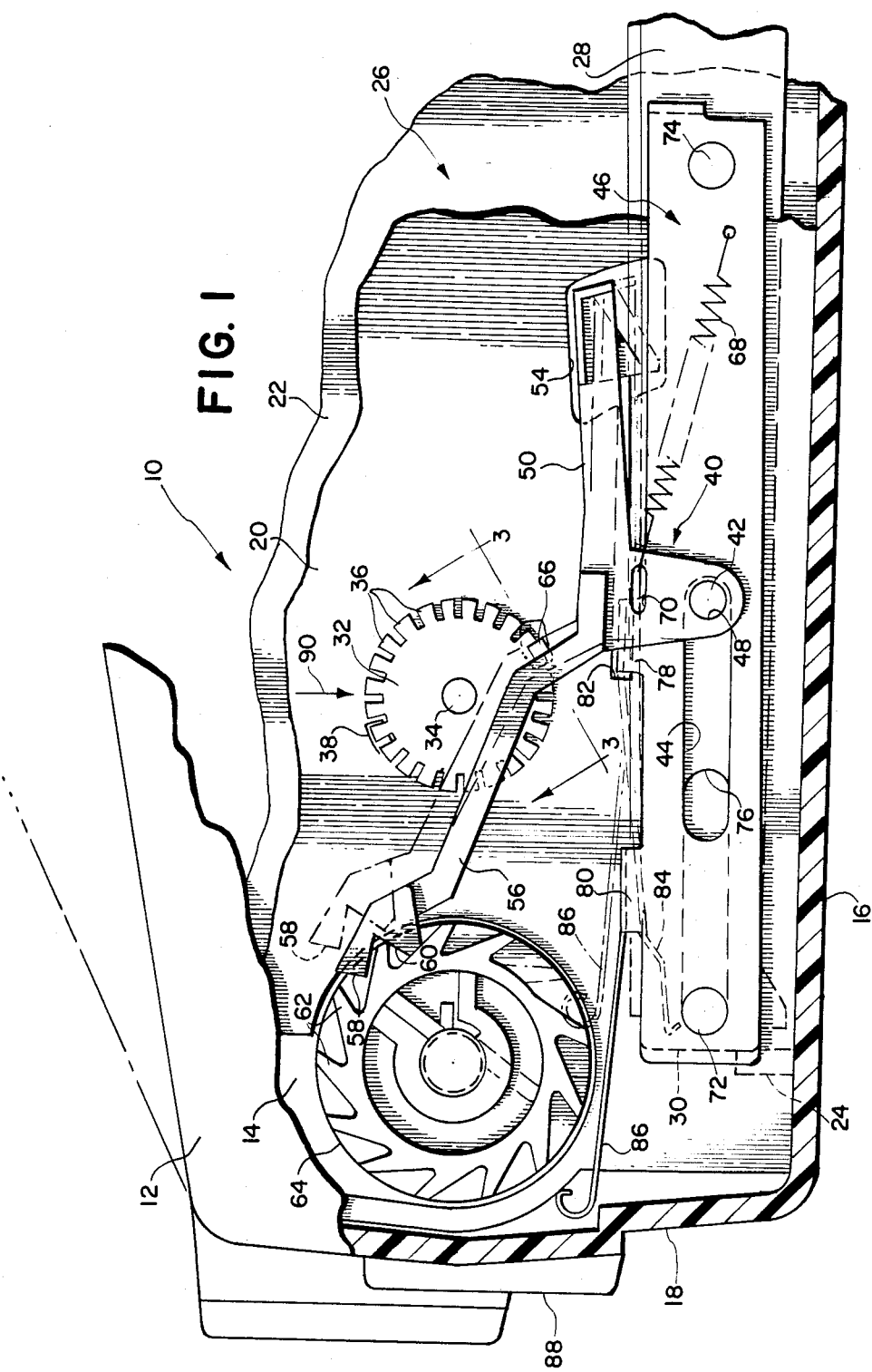
FIG. 1 is an enlarged side view, partially in section, of a portion of a camera which incorporates the instant invention.

Reference is now made to the drawings, and in particular to FIG. 1 wherein is shown a rear portion of an instant type photographic camera 10 having a pair of laterally spaced side walls 12 and 14 which are interconnected at their lower ends by a bottom wall 16 and at their trailing ends by a trailing end wall 18. Mounted within the camera 10 is an inner frame comprised of a pair of laterally spaced side walls 20 and 22 which are interconnected by a laterally extending wall 24. The inner frame defines, in part, a film chamber 26 for receiving and locating a film cassette 28 containing a plurality of individual film units in position for their sequential exposure. The inwardly facing surfaces of the side walls 20 and 22 prevent lateral movement of the film cassette 28 while engagement between the wall 24 and a trailing end 30 of the film cassette 28 limits its endwise movement into the film chamber 26.

A film cassette counter 32 is rotatably mounted on the outwardly facing surface of the side wall 20 by a pine 34. The counter 32 is formed from any suitable resilient material, and takes the form of a disk having a plurality of radially extending resilient fingers or indexable members 36 on its peripheral surface. The indexable members 36 are adapted to be sequentially rotated past a pawl 38 which extends outwardly from the side wall 20. The pawl 38 functions to maintain the film cassette counter 32 in a newly indexed position i.e., it prevents rotation of the counter 32 in a counterclockwise direction, as viewed in FIG. 1.

The film cassette counter 32 is adapted to be indexed in a clockwise direction by a unitary member 40 which is rotatably mounted on the outwardly facing surface of the side wall 20 by a pin 42. The pin 42 extends outwardly from the side wall 20, through an elongate slot 44 in a film advance mechanism 46, and is received within an aperture 48 in the unitary member 40. The unitary member 40, which senses the movement of the film cassette 28 into the film chamber 26, includes a first end 50 having an inwardly turned portion 52 which extends through an opening 54 in the side wall 20 such that it is located in the path of travel of the film cassette 28 as it is being inserted into the film chamber 26, trailing end 30 first. The unitary member 40 also includes a second end 56 which functions as a pawl having a pair of surfaces 58 and 60 which are adapted to cooperate with the teeth 62 on a film counter drum 64 to maintain it in its newly indexed position, i.e., limit clockwise rotation of the drum 64. Located intermediate the first and second ends 50 and 56 is an inwardly extending portion 66 which is located adjacent a recess 67 in the side wall 20 and which functions to interconnect the unitary member 40 with the film cassette counter 32 such that the movement of the former is transferred to the latter. A spring 68 has one of its ends secured within a slot 70 in the unitary member 40 and its other end secured to the film advance mechanism 46 for resiliently urging the latter into the position shown in FIG. 1, and for resiliently urging the unitary member 40 into the broken line position shown in FIG. 1 where its end portion 52 is located in the path of travel of the film cassette 28.

The film advance mechanism 46 is mounted to the side wall 20 for reciprocating movement by a pair of pins 72 and 74 which ride in a pair of horizontal slots 76, only one of which is shown, formed in the side wall 20. The film advance mechanism 46 includes a pair of longitudinally spaced, inwardly turned flanges 78 and 80. The flange 78 extends through an elongate opening 82 in the side wall 20 and carries on its free end a rearwardly extending resilient hook-like member 84 which is adapted to enter a slot in the film cassette 28 and engage the trailing end of a film unit prior to moving it out of the film cassette 28 subsequent to its exposure. The flange 80 carries another resilient hook-like member 86 which is adapted to engage one of the teeth 62 on the film counter drum 64 so as to index it in a counterclockwise direction during an exposure cycle.

A film cassette 28 is adapted to be loaded into the instant camera by pivoting a film loading door (not shown), carrying a processing liquid spreading roller assembly, about a horizontal axis and inserting the film cassette 28, trailing end 30 first, into the film chamber 26. During the insertion of the film cassette 28, the trailing end 30 thereof engages the portion 52 of the unitary member 40 and cams it upwardly thus resulting in counterclockwise rotation of the latter into the solid line position shown in FIG. 1 where its second end 56 is located in operative engagment with one of the teeth 62 on the film counter drum 64. During such rotation of the unitary member 40, the protuberance 66 moves from the position shown in FIG. 3 to the position shown in FIG. 4 thus causing the indexable member 36' to ride up and over the pawl 38. During each exposure cycle, the film advance mechanism 46 is driven to the right thereby causing the hook-like member 84 to move the exposed film unit from the film cassette 28 and into the bite of the aforementioned liquid spreading roller assembly, which in turn ruptures a container of processing liquid attached to the leading end of the film unit and spreads its contents between elements of the exposed film unit to initiate the formation of a visible image in the film unit, as is well known in the art. Also, movement of the film advance mechanism to the right results in the hook-like member 86 engaging one of the teeth 62 and indexing the film counter drum 64 so as to present the next lowest number on the face of the film counter drum 64 to a film counter window 88 located in the trailing end wall 18 of the camera 10. As mentioned above, the film counter drum 64 is maintained in its newly indexed position by one of the surfaces 58 or 60 of the unitary member 40. For a more detailed description of the film counter drum 64, reference may be had to the copending application of Kenneth J. Launie entitled "Film Counter", application Ser. No. 534,825 filed on Sept. 22, 1983, now U.S. Pat. No. 4,508,441, and assigned in common herewith.

Upon completion of the exposure of all of the film units in the film cassette 28, the aforementioned film loading door is opened and the empty film cassette 28 removed from the film chamber 26. As the film cassette 28 is moved out of engagement with the portion 52 of the unitary member 40, the spring 68 moves the latter into the broken line position shown in FIG. 1. This clockwise rotation of the unitary member 40 results in the interconnecting means or protuberance 66 moving from the position shown in FIG. 4 to the position shown in FIG. 5, the film cassette counter 32 being maintained in its previously indexed position by the pawl 38. Also, with the unitary member 40 in the broken line position, the film unit counter drum 64 is free to rotate in a clockwise direction into its starting position.

From the foregoing it can be seen that the film cassette counter 32 is indexed by one finger or indexable member 36 each time that a film cassette 28 is inserted into the film chamber 26. When such a camera is returned to or recalled by the manufacturer, the camera may be disassembled and the reading on the film cassette counter 32, as indicated by an arrow 90, recorded for future use.

Since certain changes may be made in the above described invention without departing from the scope of the invention herein involved, it is intended that all matter contained in the description thereof or shown in the accompanying drawing shall be interpreted as illustrative and not in a limiting sense.

What is claimed is:

1. Photographic apparatus for locating a film cassette in position for sequential exposure of a plurality of film units contained therein, said photographic apparatus comprising: means for defining a chamber for receiving and locating a film cassette in position for sequential exposure of a plurality of film units contained therein; means for recording a number of film cassettes which have been inserted into said chamber; means for sensing movement of a film cassette into said chamber; and means for interconnecting said sensing means and said recording means, said interconnecting means being adapted to index said recording means to a next highest number each time that said sensing means indicated movement of a film cassette into said chamber.

2. Photographic apparatus as defined in claim 1 further including means for mounting said sensing means in a path of movement of the film cassette into said chamber.

3. Photographic apparatus as defined in claim 2 wherein said recording means comprises a disk having indexable members.

4. Photographic apparatus as defined in claim 3 wherein said indexable members are deflectable out of a plane of said disk by said interconnecting means.

5. Photographic apparatus as defined in claim 4 wherein said interconnecting means extends integrally from said sensing means.

6. Photographic apparatus as defined in claim 1 further including a film counter and means for indexing said film counter during an exposure cycle for indicating how many unexposed film units remain in a film cassette located within said chamber, said sensing means including means for maintaining said film counter in a newly indexed position.

7. Photographic apparatus as defined in claim 6 further including means for resiliently biasing said sensing means into the path of movement of a film cassette into said chamber.

8. Photographic apparatus as defined in claim 7 further including means for moving said indexing means from a first position to a second position so as to index said film counter in a given direction, and said biasing means is connected between said sensing means and said indexing means for returning said indexing means to said first position.

* * * * *